US009546314B2

(12) United States Patent
Eoff et al.

(10) Patent No.: US 9,546,314 B2
(45) Date of Patent: Jan. 17, 2017

(54) TREATMENT FLUIDS CONTAINING A RELATIVE PERMEABILITY MODIFIER AND A COMPANION POLYMER INTERACTING SYNERGISTICALLY THEREWITH AND METHODS FOR USE THEREOF

(75) Inventors: Larry S. Eoff, Duncan, OK (US); Jeff W. Loucks, Duncan, OK (US); B. Raghava Reddy, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 809 days.

(21) Appl. No.: 13/081,607

(22) Filed: Apr. 7, 2011

(65) Prior Publication Data

US 2012/0258894 A1    Oct. 11, 2012

(51) Int. Cl.
| | |
|---|---|
| *C09K 8/60* | (2006.01) |
| *C09K 8/508* | (2006.01) |
| *C09K 8/035* | (2006.01) |
| *C09K 8/588* | (2006.01) |

(52) U.S. Cl.
CPC .............. *C09K 8/508* (2013.01); *C09K 8/035* (2013.01); *C09K 8/588* (2013.01)

(58) Field of Classification Search
CPC ...................................................... C09K 8/60
See application file for complete search history.

(56) References Cited

U.S. PATENT DOCUMENTS

| | | | |
|---|---|---|---|
| 3,743,018 A | 7/1973 | Norton et al. | |
| 4,040,967 A | 8/1977 | Nimerick et al. | |
| 4,042,529 A | 8/1977 | Nimerick et al. | |
| 4,152,274 A | 5/1979 | Phillips et al. | |
| 4,396,731 A | 8/1983 | Dawans et al. | |
| 4,532,052 A | 7/1985 | Weaver et al. | |
| 5,566,760 A | 10/1996 | Harris | |
| 5,806,592 A * | 9/1998 | Forrest | 166/267 |
| 6,476,169 B1 | 11/2002 | Eoff et al. | |
| 6,547,871 B2 | 4/2003 | Chatterji et al. | |
| 6,605,570 B2 | 8/2003 | Miller et al. | |
| 7,081,439 B2 | 7/2006 | Sullivan et al. | |
| 7,114,568 B2 | 10/2006 | Eoff et al. | |
| 7,159,659 B2 | 1/2007 | Welton et al. | |
| 7,299,874 B2 | 11/2007 | Welton et al. | |
| 7,303,019 B2 | 12/2007 | Welton et al. | |
| 7,445,044 B2 | 11/2008 | Walters et al. | |
| 7,547,665 B2 | 6/2009 | Welton et al. | |
| 7,584,791 B2 | 9/2009 | Robb et al. | |
| 7,589,048 B2 | 9/2009 | Eoff et al. | |
| 7,595,282 B2 | 9/2009 | Pauls et al. | |
| 7,595,283 B2 | 9/2009 | Eoff et al. | |
| 7,621,334 B2 | 11/2009 | Welton et al. | |
| 7,694,739 B2 | 4/2010 | Brothers et al. | |
| 7,717,180 B2 | 5/2010 | Badalamenti et al. | |
| 7,727,936 B2 | 6/2010 | Pauls et al. | |
| 7,727,937 B2 | 6/2010 | Pauls et al. | |
| 7,748,456 B2 | 7/2010 | Pauls et al. | |
| 7,759,292 B2 | 7/2010 | Eoff et al. | |
| 7,814,980 B2 | 10/2010 | Bryant et al. | |
| 7,829,508 B2 | 11/2010 | Pauls et al. | |
| 7,846,877 B1 | 12/2010 | Robb | |
| 7,862,655 B2 | 1/2011 | Brothers et al. | |
| 7,885,944 B1 | 2/2011 | Bruening | |
| 8,008,235 B2 | 8/2011 | Eoff et al. | |
| 8,091,638 B2 | 1/2012 | Dusterhoft et al. | |
| 8,278,250 B2 | 10/2012 | Dalrymple et al. | |
| 8,883,695 B2 | 11/2014 | Eoff et al. | |
| 2002/0169085 A1 | 11/2002 | Miller et al. | |
| 2004/0121916 A1 | 6/2004 | Kono et al. | |
| 2004/0171495 A1 * | 9/2004 | Zamora et al. | 507/100 |
| 2004/0229756 A1 | 11/2004 | Eoff et al. | |
| 2005/0107503 A1 | 5/2005 | Couillet et al. | |
| 2005/0199396 A1 | 9/2005 | Sierra et al. | |
| 2006/0124309 A1 | 6/2006 | Nguyen et al. | |
| 2006/0137875 A1 | 6/2006 | Dusterhoft et al. | |
| 2006/0183646 A1 | 8/2006 | Welton et al. | |
| 2006/0185848 A1 | 8/2006 | Surjaatmadja et al. | |
| 2007/0042913 A1 * | 2/2007 | Hutchins et al. | 507/269 |
| 2008/0190609 A1 * | 8/2008 | Robb et al. | 166/279 |
| 2009/0095535 A1 * | 4/2009 | Nguyen | 175/72 |
| 2009/0203555 A1 * | 8/2009 | Milne et al. | 507/222 |
| 2010/0216672 A1 | 8/2010 | Todd | |
| 2010/0307749 A1 | 12/2010 | Nguyen et al. | |
| 2011/0098377 A1 | 4/2011 | Huang et al. | |
| 2012/0135895 A1 | 5/2012 | Eoff | |

FOREIGN PATENT DOCUMENTS

| | | |
|---|---|---|
| WO | WO 2008/096165 A1 | 8/2008 |
| WO | WO 2009/125164 A1 | 10/2009 |

OTHER PUBLICATIONS

U.S. Appl. No. 12/956,569, filed Nov. 30, 2010.

\* cited by examiner

*Primary Examiner* — Jeffrey Washville
(74) *Attorney, Agent, or Firm* — McDermott Will & Emery LLP; Craig Roddy

(57) ABSTRACT

Methods and compositions are described for treating water- and hydrocarbon-producing subterranean formations with a relative permeability modifier at concentrations below those conventionally used in the art, while not substantially impacting the treatment fluid's performance. Treatment fluids described herein comprise a base fluid, a relative permeability modifier comprising a hydrophobically modified hydrophilic polymer, and a companion polymer interacting synergistically with the relative permeability modifier such that the treatment fluid is operable to reduce the water permeability or to increase an aqueous fluid injection pressure of at least a portion of a subterranean formation by more than the relative permeability modifier or the companion polymer acting alone at like concentration. The water permeability reduction and/or the aqueous fluid injection pressure increase can be more than additive. Methods described herein comprise placing such treatment fluids in at least a portion of a subterranean formation.

14 Claims, No Drawings

TREATMENT FLUIDS CONTAINING A RELATIVE PERMEABILITY MODIFIER AND A COMPANION POLYMER INTERACTING SYNERGISTICALLY THEREWITH AND METHODS FOR USE THEREOF

BACKGROUND

The present invention relates to methods and compositions for treating at least a portion of a water- and hydrocarbon-producing subterranean formation with a relative permeability modifier, and, more specifically, to improved treatment fluids and methods for use thereof in which concentrations of the relative permeability modifier are appreciably below those conventionally used in the art, while not substantially impacting the treatment fluid's effectiveness to reduce the water permeability or to increase an aqueous fluid injection pressure of the treated portion of the subterranean formation.

The unwanted production of water from hydrocarbon-producing wells constitutes a considerable technical problem and expense in oilfield operations. When a subterranean formation contains water in significant amounts, water's higher mobility often allows it to flow to a well bore penetrating the formation by way of natural and manmade fractures and high permeability zones. If the ratio of recovered water to recovered hydrocarbons becomes sufficiently large, the cost of separating the water from the hydrocarbons and disposing of it can become a barrier to continued production. This can lead to abandonment of a well penetrating a subterranean formation, even when significant amounts of hydrocarbons remain therein.

In order to reduce the undesired production of water from hydrocarbon-producing subterranean formations, aqueous-soluble polymer systems containing crosslinking agents have been utilized in the art to enter water-containing zones of the formation and block the flow of water therefrom. Selective placement of these crosslinked polymers in a subterranean formation and stability therein represent significant technical challenges that have somewhat limited their use. A more recent strategy to reduce water production from a subterranean formation has been to utilize agents known as relative permeability modifiers. Such relative permeability modifiers are capable of significantly reducing the flow of water from a subterranean formation while having a minimal effect on the flow of hydrocarbons. The use of relative permeability modifiers does not necessitate the use of zonal isolation techniques that are often employed with crosslinked polymers.

Relative permeability modifiers can also be used to pretreat a subterranean formation and divert the flow of a subsequently added aqueous treatment fluid therein. Diversion of the treatment fluid flow in such cases is primarily accomplished by increasing the injection pressure of the treatment fluid. Unless diverted, the injected aqueous treatment fluid often takes the path of least resistance through the subterranean formation by flowing through high permeability pathways from the injector and can bypass the desired treatment zones. In applications such as enhanced oil recovery (EOR) methods, aqueous fluid chemical flooding techniques are frequently used. Unless the chemical flood is diverted to a desired subterranean zone, lower than expected oil production will be realized. Similar effects can be observed when aqueous treatment fluids (e.g., acidizing fluids, scale removal fluids, and the like) are used in treating subterranean formations having significant water permeability.

From an economic standpoint alone, it would be desirable to decrease the volume of treatment fluid being placed in a subterranean formation and/or to reduce the amount of relative permeability modifier being used in a treatment fluid, while not substantially impacting the treatment fluid's downhole performance for controlling water flow or increasing the aqueous fluid injection pressure of subsequently added treatment fluids.

SUMMARY OF THE INVENTION

The present invention relates to methods and compositions for treating at least a portion of a water- and hydrocarbon-producing subterranean formation with a relative permeability modifier, and, more specifically, to improved treatment fluids and methods for use thereof in which concentrations of the relative permeability modifier are appreciably below those conventionally used in the art, while not substantially impacting the treatment fluid's effectiveness to reduce the water permeability or to increase an aqueous fluid injection pressure of the treated portion of the subterranean formation.

In one embodiment, the present invention provides a method comprising: providing a treatment fluid that comprises: a base fluid; a relative permeability modifier that comprises a hydrophobically modified hydrophilic polymer; and a companion polymer interacting synergistically with the relative permeability modifier such that the treatment fluid is operable to reduce the water permeability or to increase an aqueous fluid injection pressure of at least a portion of a subterranean formation by more than through using the relative permeability modifier or the companion polymer acting alone at like concentration; and placing the treatment fluid in at least a portion of a subterranean formation.

In one embodiment, the present invention provides a method comprising: providing a treatment fluid that comprises: a base fluid; a relative permeability modifier that comprises a hydrophobically modified hydrophilic polymer; and a companion polymer that comprises at least an acrylamide monomer unit; wherein the companion polymer is not hydrophobically modified; placing the treatment fluid in at least a portion of a subterranean formation; and allowing the treatment fluid to reduce a water permeability or to increase an aqueous fluid injection pressure of the portion of the subterranean formation.

In one embodiment, the present invention provides a treatment fluid comprising: a base fluid; a relative permeability modifier that comprises a hydrophobically modified hydrophilic polymer; and a companion polymer interacting synergistically with the relative permeability modifier such that the treatment fluid is operable to reduce the water permeability or to increase an aqueous fluid injection pressure of at least a portion of a subterranean formation by more than through using the relative permeability modifier or the companion polymer acting alone.

The features and advantages of the present invention will be readily apparent to one of ordinary skill in the art upon a reading of the description of the preferred embodiments that follows.

DETAILED DESCRIPTION

The present invention relates to methods and compositions for treating at least a portion of a water- and hydrocarbon-producing subterranean formation with a relative permeability modifier, and, more specifically, to improved treatment fluids and methods for use thereof in which concentrations of the relative permeability modifier are appreciably below those conventionally used in the art, while not substantially impacting the treatment fluid's effectiveness to reduce the water permeability or to increase an aqueous fluid injection pressure of the treated portion of the subterranean formation.

There are many advantages of the present invention, only a few of which are discussed or alluded to herein. The present invention provides treatment fluid compositions and methods for use thereof in which relative permeability modifiers are used in considerably lower concentrations than are conventional in the art, while still providing comparable downhole performance. This can result in beneficial reductions in cost of goods and, perhaps more importantly, lessened environmental impacts when treating a subterranean formation. Specifically, the combination of a relative permeability modifier and a companion polymer in the present embodiments can produce a water permeability reduction and/or increase an aqueous fluid injection pressure (i.e., increased resistance to aqueous fluid flow) in at least a portion of a subterranean formation that is comparable to that seen when higher concentrations of relative permeability modifier are used without the companion polymer being present. The present invention can allow lower total polymer concentrations or amounts (e.g., the combined concentration or amounts of the relative permeability modifier and the companion polymer) to be used in the treatment fluid in order to obtain a downhole water permeability reduction and/or increased aqueous fluid injection pressure that is comparable to that seen with higher concentrations of the relative permeability modifier alone.

It is believed that the combination of the relative permeability modifier and the companion polymer in the present treatment fluids can surprisingly produce a water permeability reduction and/or increased aqueous fluid injection pressure in at least a portion of a subterranean formation that is greater than the additive effect of the relative permeability modifier and the companion polymer acting independently. That is, in the present treatment fluids, a greater reduction in water permeability and/or increased aqueous fluid injection pressure can be realized than through the independent use of separate treatment fluids containing the relative permeability modifier or the companion polymer alone at like concentrations. Without being bound by theory or mechanism, it is believed that this unexpected result arises from a synergistic interaction between the relative permeability modifier and the companion polymer resulting from a polymer complex that forms through a hydrogen bonding interaction or ionic association between suitable functional groups of the relative permeability modifier and the companion polymer. Examples of polymer functional groups that are suitable for hydrogen bonding can include a neutral or protonated amine on a first polymer chain and a hydroxyl group or a carboxylate anion on a second polymer chain. Examples of polymer functional groups that are suitable for forming an ionic association include quaternary ammonium ions on a first polymer chain and a carboxylate anion on a second polymer chain.

Concerns have recently been raised regarding the environmental impact of treatment fluids used during various subterranean operations. Since the treatment fluids of the present invention contain lower concentrations or amounts of relative permeability modifier than do conventional treatment fluids, the present treatment fluids may be particularly advantageous from an environmental standpoint.

Still further, because the present treatment fluids contain much lower concentrations or amounts of relative permeability modifier than are conventionally used in the art, they can be used in subterranean formations having conditions (e.g., high or low pH and/or temperature) under which higher concentrations or amounts of the relative permeability modifier can become unstable. For example, under certain conditions, some relative permeability modifiers can precipitate from a treatment fluid. The stability of the present treatment fluids can be further enhanced through various additives, as described in more detail below.

The present treatment fluids and methods can advantageously be used in any of the production stage, the stimulation stage, EOR operations, or the remediation stage of a subterranean operation to address downhole water or injected aqueous fluids. As defined herein, a "treatment fluid" is a fluid that is placed in a subterranean formation in order to perform a desired function. Treatment fluids can be used in a variety of subterranean operations, including, but not limited to, production treatments, stimulation treatments, remedial treatments, fluid diversion operations, fracturing operations, secondary or tertiary EOR operations, and the like. As used herein, the terms "treatment" and "treating" refer to any subterranean operation that uses a fluid in conjunction with performing a desired function and/or achieving for a desired purpose. The terms "treatment" and "treating," as used herein, do not imply any particular action by the fluid or any particular component thereof unless otherwise specified. Treatment fluids can include, without limitation, fracturing fluids, acidizing fluids, conformance treatments, damage control fluids, remediation fluids, scale removal and inhibition fluids, chemical floods, and the like.

Treatment fluids of the present invention generally comprise an aqueous phase base fluid. Aqueous phase base fluids can include, for example, fresh water, acidified water, salt water, seawater, brine, or an aqueous salt solution. In some embodiments, the treatment fluids can also contain small amounts of hydrocarbons such that the aqueous base fluid remains as the continuous phase. Specifically, certain companion polymers described herein are obtained in a hydrocarbon base fluid. Inclusion of small amounts of hydrocarbons from the companion polymer source does not significantly impact the performance of the present treatment fluids.

In various embodiments, treatment fluids of the present invention can include an aqueous phase base fluid as the continuous phase. In some embodiments, the aqueous phase base fluid can be an aqueous salt solution. Such aqueous salt solutions can have a salt concentration ranging between about 0.1% and about 10% by weight. The salt concentration can range between about 1% and about 10% by weight in some embodiments or between about 2% and about 5% by weight in other embodiments.

In some embodiments, treatment fluids of the present invention comprise a base fluid, a relative permeability modifier and a companion polymer that interacts synergistically with the relative permeability modifier. In general, the relative permeability modifier comprises a hydrophobically modified hydrophilic polymer. The synergistic interaction between the relative permeability modifier and the companion polymer is such that the treatment fluid is operable to reduce the water permeability of at least a portion of a subterranean formation by more than through using the relative permeability modifier or the companion polymer acting alone at like concentration. Alternately, the synergistic interaction between the relative permeability modifier and the companion polymer is such that the treatment fluid is operable to increase the aqueous fluid injection pressure of an aqueous treatment fluid (e.g., an acidizing fluid, an EOR fluid, and the like) by more than through using the relative permeability modifier or the companion polymer acting alone at like concentration.

In some embodiments, the treatment fluid is operable to reduce the water permeability of the portion of the subterranean formation by at least about 80%. The reduction in water permeability can be at least about 85% in some embodiments, or at least about 90% in some embodiments, or at least about 95% in some embodiments, or at least about 98% in some embodiments, or at least about 99% in some embodiments. The water permeability reduction can be due to a synergistic interaction between the relative permeability modifier and the companion polymer. In some or other embodiments, a concentration of the relative permeability modifier in the treatment fluid is only operable to reduce the water permeability of the subterranean formation by about 5% to about 80% without the companion polymer.

Measurement of the water permeability reduction of a subterranean formation can be determined by measuring the permeability reduction of a core sample obtained from the subterranean formation. Illustrative methods for determining the water permeability reduction of a subterranean formation core sample are described in U.S. Pat. No. 6,476,169, which is incorporated herein by reference in its entirety. An untreated core sample has no water permeability reduction. Increases in aqueous fluid injection pressure can be determined by like methods through measuring the pressure increase in the core sample following administration of the treatment fluid.

In some or other embodiments, the treatment fluid is operable to increase the injection pressure of an aqueous treatment fluid into the portion of the subterranean formation by about 50% to about 500% compared to that achievable using the relative permeability modifier or the companion polymer acting alone. In some or other embodiments, a concentration or amount of the relative permeability modifier and the companion polymer in the treatment fluid is only operable to increase the aqueous fluid injection pressure by about 1% to about 10% when the relative permeability modifier or the companion polymer is used alone. In some embodiments, the amount of relative permeability modifier in the treatment fluid needed to achieve a given aqueous fluid injection pressure increase is only about 20% to about 50% of that needed when the companion polymer is absent.

Determining that a synergistic interaction exists between a relative permeability modifier and a companion polymer to produce a water permeability reduction or increase in aqueous fluid injection pressure that is more than additive can be ascertained as described for the following non-limiting prophetic examples. In various embodiments, the water permeability reduction or aqueous fluid injection pressure increase of the subterranean formation can be assessed by measuring the water permeability reduction or aqueous fluid injection pressure increase of a core sample or column packed with a suitable particulate material (e.g., sand or calcium carbonate) as referenced above. It is to be presumed that the reduction in water permeability or increase in aqueous fluid injection pressure of the core sample is representative of the subterranean formation as a whole.

Prophetic Example 1

Consider a treatment fluid containing a relative permeability modifier and a companion polymer that produces a water permeability reduction of 95%. Further consider treatment fluids of like composition and concentration containing only the relative permeability modifier or the companion polymer, but not both, in which the water permeability reduction produced is 10% and 50%, respectively. In such an example, one of ordinary skill in the art should expect a water permeability reduction of only about 60% in the combined treatment fluid, if the effects of the relative permeability modifier and the companion polymer were simply additive in nature. If the water permeability reduction is considerably higher, as in the present example, the relative permeability modifier and the companion polymer can be considered to be interacting synergistically to produce a non-additive water permeability reduction.

Prophetic Example 2

Consider a treatment fluid containing a relative permeability modifier and a companion polymer that produces a water permeability reduction of 95%. Further consider treatment fluids of like composition and concentration containing only the relative permeability modifier or the companion polymer, but not both, in which the water permeability reduction produced is 70% and 50%, respectively. In this example, the additive water permeability reduction of the combined treatment fluid sums to more than 100%, and a synergistic interaction between the relative permeability modifier and the companion polymer may not be directly detected due to the tested concentrations being too high, although the concept of a synergistic interaction can still apply. In cases where the additive water permeability reduction sums to more than 100% or sums to very nearly 100%, the tested concentrations can be lowered and the treatment fluids retested to determine if the water permeability reduction is indeed more than additive.

Like prophetic examples for aqueous fluid injection pressure increases that demonstrate a synergistic interaction can be envisioned by one having ordinary skill in the art. It should be noted that aqueous fluid injection pressure increases can be used to directly detect a synergistic interaction, even in cases where the individual water permeability reductions sum to more than 100% (see Prophetic Example 2). Specifically, if the measured aqueous fluid injection pressure of the treatment fluid containing both the relative permeability modifier and the companion polymer is greater than the sum of the aqueous fluid injection pressure of the relative permeability modifier and the companion polymer alone, a synergistic interaction can be indicated.

In certain embodiments, it should also be noted that reduction of the water permeability of a portion of a subterranean formation is not necessarily accompanied by an increase in aqueous fluid injection pressure, even though such effects are frequently observed in concert with one another. For example, a water permeability reduction of greater than about 95% can be achieved without a significant pressure increase. Conversely, an increase in aqueous fluid injection pressure due to treatment of a portion of a subterranean formation does not necessarily indicate that the water permeability has been reduced. For the purposes of this invention, the phenomena may be considered to be unrelated. In some embodiments, an aqueous fluid injection pressure increase resulting from treatment with a relative permeability modifier allows for diversion of additional relative permeability modifier or other aqueous treatment fluids (e.g., an acidizing fluid or an EOR fluid) into untreated zones.

In some embodiments, treatment fluids of the present invention comprise a base fluid, a relative permeability modifier that comprises a hydrophobically modified hydrophilic polymer, and a companion polymer that comprises at least an acrylamide monomer unit, where the companion polymer is not hydrophobically modified.

In some embodiments, treatment fluids of the present invention comprise a base fluid, a relative permeability modifier that comprises a hydrophobically modified hydrophilic polymer that comprises at least one monomer unit derived from a cetyldimethylammoniumethyl methacrylate halide, and a companion polymer. In some embodiments, a concentration of the relative permeability modifier in the treatment fluid can be below its normal effective working concentration. In some embodiments, the treatment fluid can be operable to reduce the water permeability of at least a portion of a subterranean formation by at least about 80% or to increase an aqueous fluid injection pressure of at least a portion of a subterranean formation above about 100 psi.

In some embodiments, treatment fluids of the present invention are placed in at least a portion of a subterranean formation. In some embodiments, the treatment fluids are allowed to reduce a water permeability of at least a portion of the subterranean formation or to increase an aqueous fluid injection pressure of at least a portion of the subterranean formation.

In some embodiments, methods of the present invention comprise providing a treatment fluid that comprises a base fluid, a relative permeability modifier that comprises a hydrophobically modified hydrophilic polymer, and a companion polymer that interacts synergistically with the relative permeability modifier such that the treatment fluid is operable to reduce the water permeability or increase an aqueous fluid injection pressure of at least a portion of a subterranean formation by more than through using the relative permeability modifier or the companion polymer acting alone; and placing the treatment fluid in at least a portion of a subterranean formation.

In some embodiments, methods of the present invention comprise providing a treatment fluid that comprises a base fluid, a relative permeability modifier that comprises a hydrophobically modified hydrophilic polymer, and a companion polymer that comprises at least an acrylamide monomer unit; and placing the treatment fluid in at least a portion of a subterranean formation. In such treatment fluids, the companion polymer is not hydrophobically modified. In some embodiments, the methods further include allowing the treatment fluid to reduce a water permeability or to increase an aqueous fluid injection pressure of the portion of the subterranean formation.

As used herein, the term "not hydrophobically modified" refers to a base polymer that does not contain a hydrophobic modification thereon. As used herein, a hydrophobic modification of a base polymer will be considered to be any hydrophobic group having more than about 4 carbon atoms.

In some embodiments, methods of the present invention comprise providing a treatment fluid that comprises a base fluid, a relative permeability modifier that comprises a hydrophobically modified hydrophilic polymer that comprises at least one monomer unit derived from a cetyldimethylammoniumethyl methacrylate halide, and a companion polymer; and placing the treatment fluid in at least a portion of a subterranean formation. In such treatment fluids, a concentration of the relative permeability modifier in the treatment fluid can be below its normal effective working concentration. Further, in such embodiments, the treatment fluid can be operable to reduce the water permeability of at least a portion of the subterranean formation by at least about 80% or to increase an aqueous fluid injection pressure of at least a portion of the subterranean formation above about 100 psi. In some or other embodiments, a concentration and/or amount of the relative permeability modifier in the treatment fluid is only operable to increase the aqueous fluid injection pressure by about 1% to about 10% of the value achievable when used in combination with the companion polymer.

Relative permeability modifiers used in the present embodiments are generally hydrophobically modified hydrophilic polymers, which are described in more detail in commonly owned U.S. Pat. No. 6,476,169, which is incorporated herein by reference in its entirety above. Hydrophobically modified hydrophilic polymers vary widely in structure, but generally comprise a hydrophilic polymer that has been at least partially chemically modified with hydrophobic groups (e.g., long chain alkyl groups having more than about 4 carbon atoms in some embodiments or more than about 6 carbons in other embodiments). In some embodiments, an existing hydrophilic polymer can be at least partially functionalized with a plurality of hydrophobic groups to produce a hydrophobically modified hydrophilic polymer. In other embodiments, a hydrophilic monomer unit functionalized with a hydrophobic group can be polymerized with itself or copolymerized with a hydrophilic monomer unit not containing hydrophobic functionalization to produce a hydrophobically modified hydrophilic polymer.

Hydrophobically modified hydrophilic polymers of the present embodiments can comprise at least one hydrophobically modified hydrophilic monomer and, optionally, at least one hydrophilic monomer. As such, the hydrophobically modified hydrophilic polymers of the present embodiments can be homopolymers, copolymers, terpolymers or higher order polymer structures. Positioning of the hydrophilic monomer units and the hydrophobically modified hydrophilic monomer units in copolymer and higher order polymer structures can vary without limitation and can be, for example, alternating, random, block or a combination thereof. Examples of suitable hydrophilic monomers include, for example, 2-acrylamido-2-methyl propane sulfonic acid, N,N-dimethylacrylamide, vinyl pyrrolidone, dimethylaminoethyl methacrylate, dimethylaminoethyl methacrylamide, acrylic acid, methacrylic acid, dimethylaminopropyl methacrylate, dimethylaminopropyl methacrylamide, trimethylammoniumethyl methacrylate halide (halide=chloride, bromide, iodide or a halide equivalent such as, for example, a tosylate or methanesulfonate), acrylamide, methacrylamide, and hydroxyethyl acrylate.

In some embodiments, hydrophobically modified hydrophilic polymers can be prepared by polymerizing at least one hydrophobically modified hydrophilic monomer or a mixture of at least one hydrophobically modified hydrophilic monomer and at least one hydrophilic monomer. Illustrative hydrophobically modified hydrophilic monomers include, for example, alkyl acrylates, alkyl methacrylates, alkyl acrylamides, alkyl methacrylamides, alkyldimethylammoniumethyl methacrylate bromide, alkyldimethylammoniumethyl methacrylate chloride, alkyldimethylammoniumethyl methacrylate iodide, alkyldimethylammoniumpropyl methacrylate bromide, alkyldimethylammoniumpropyl methacrylate chloride, alkyldimethylammoniumpropyl methacrylate iodide, alkyldimethylammoniumethyl methacrylamide bromide, alkyldimethylammoniumethyl methacrylamide chloride, alkyldimethylammoniumethyl methacrylamide iodide, alkyldimethylammoniumpropyl methacrylamide bromide, alkyldimethylammoniumpropyl methacrylamide chloride and alkyldimethylammoniumpropyl methacrylamide iodide.

In general, alkyl groups of the hydrophobically modified hydrophilic monomers contain about 4 to about 22 carbon atoms.

In some embodiments, the hydrophobically modified hydrophilic polymer comprises at least one alkyldimethylammoniumethyl methacrylate halide as the hydrophobically modified hydrophilic monomer. In some embodiments, the alkyl group comprises about 4 to about 22 carbon atoms. In some embodiments, the alkyl group comprises about 6 to about 22 carbon atoms. In such embodiments, the halide can be chloride, bromide, iodide, or a halide equivalent (e.g., toluenesulfonate or methanesulfonate), for example. In more specific embodiments, the alkyl group can be a cetyl group containing 16 carbon atoms. That is, in some embodiments, a cetyldimethylammoniumethyl methacrylate halide monomer unit can be polymerized to form the hydrophobically modified hydrophilic polymer or a dimethylaminoethyl methacrylate monomer unit in a hydrophilic polymer can be hydrophobically modified with an agent such as, for example, a cetyl halide or a cetyl halide equivalent.

In some embodiments, the relative permeability modifier can be a hydrophobically modified hydrophilic polymer that comprises at least one monomer unit derived from a cetyldimethylammoniumethyl methacrylate halide. Such a relative permeability modifier contains at least the following structural unit in its polymer backbone, where the wavy lines represent bonding to other monomer units.

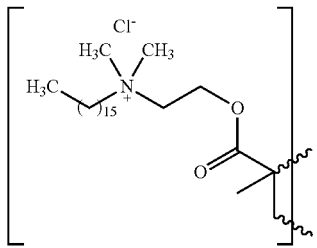

As noted above, relative permeability modifiers containing this monomer unit can be homopolymers or copolymers or higher order polymer structures containing a hydrophilic monomer. For example, in one embodiment, a relative permeability modifier can contain dimethylaminoethyl methacrylate and the above monomer unit derived from a cetyldimethylammoniumethyl methacrylate halide. This relative permeability modifier is sold under the trade name "HPT-1" by Halliburton Energy Services of Duncan, Okla. Specific synthetic procedures and disclosure relating to this relative permeability modifier are described in commonly owned U.S. Pat. No. 7,114,568, which is incorporated herein by reference in its entirety.

When not combined with a companion polymer, normal effective working concentrations of most relative permeability modifiers comprising a hydrophobically modified hydrophilic polymer range between about 0.1% and about 3.0% by weight in a treatment fluid. Choice of the normal effective working concentration will be a function of the temperature and porosity of the subterranean formation. In more specific embodiments, such relative permeability modifiers have normal effective working concentrations ranging between about 0.2% and about 1.0% by weight in a treatment fluid. In general, such normal effective working concentrations of the relative permeability modifier give a water permeability reduction of greater than about 95% in a subterranean formation. In some embodiments, such normal effective working concentrations of the relative permeability modifier can give aqueous fluid injection pressure increases of about 20 psi to about 500 psi. At relative permeability modifier concentrations below about 0.1% by weight, a water permeability reduction of less than about 95% or, more particularly, a water permeability reduction of less than about 80% can be obtained. This level of permeability reduction can be ineffective in various subterranean operations. In the present embodiments, however, relative permeability modifier concentrations below those conventionally used in the art can still produce a water permeability reduction of at least about 80% or even at least about 95% through use of small concentrations of the companion polymer.

Concentrations of the relative permeability modifier in the present embodiments are generally about 0.15% or lower by weight in the treatment fluid. In some embodiments, a concentration of the relative permeability modifier is about 0.12% or lower by weight in the treatment fluid, or about 0.10% or lower by weight in the treatment fluid, or about 0.08% or lower by weight in the treatment fluid, or about 0.06% or lower by weight in the treatment fluid, or about 0.04% or lower by weight in the treatment fluid, or about 0.02% or lower by weight in the treatment fluid. In some embodiments, a concentration of the relative permeability modifier is about 0.01% or lower by weight in the treatment fluids of the present invention. Depending on the temperature and porosity of the subterranean formation being treated, these concentrations of the relative permeability modifier can be ineffective to produce a water permeability reduction of greater than about 80% in the absence of a companion polymer. Alternately, these concentrations of relative permeability modifier can produce an aqueous fluid injection pressure increase of about 20 psi or greater in some embodiments, about 100 psi or greater in other embodiments, or about 300 psi or greater in still other embodiments.

The concentration of the companion polymer in the present treatment fluids is generally chosen such that the water permeability is less than about 80% or the aqueous fluid injection pressure increase is less than about 100 psi when a subterranean formation is treated using the companion polymer alone. Although not required to be so, a concentration of the companion polymer is generally less than the concentration of the relative permeability modifier. In some embodiments, the total polymer concentration (e.g., the aggregate concentration of relative permeability modifier and companion polymer) can be less than the relative permeability modifier concentrations used in conventional treatment fluids of the art. Concentrations of the companion polymer are generally about 0.25% or below by weight in the treatment fluids of the present invention. In some embodiments, a concentration of the companion polymer is about 0.2% or below by weight in the treatment fluid, or about 0.15% or below by weight in the treatment fluid, or about 0.1% or below by weight in the treatment fluid, or about 0.05% or below by weight in the treatment fluid, or about 0.04% or below by weight in the treatment fluid, or about 0.03% or below by weight in the treatment fluid, or about 0.02% or below by weight in the treatment fluid, or about 0.01% or below by weight in the treatment fluids. In some embodiments, a concentration of the companion polymer ranges between about 0.25% and 0.005% by weight in the treatment fluid. In other embodiments, a concentration of the companion polymer ranges between about 0.025% and about 0.0075% by weight in the treatment fluid.

A number of different companion polymers can be used in the present embodiments, whereby synergistic interactions with a relative permeability modifier can be observed in a treatment fluid. In various embodiments, the companion polymer is not a hydrophobically modified polymer. In some embodiments, the companion polymer can comprise at least one of a cationic, an anionic or a non-ionic polymer. In some embodiments, the companion polymer can comprise at least one of an acrylamide monomer unit or an acrylate ester monomer unit. That is, in such embodiments, the companion polymer can be a polyacrylamide, a polyacrylate, or an acrylate/acrylamide copolymer. In some or other embodiments, suitable companion polymers can also include acrylamide/diallyldimethyl ammonium chloride copolymers, diutans, and polyethyleneimine. A suitable polyethyleneimine for use in the present embodiments can be "HZ-20," which is commercially available from Halliburton Energy Services of Duncan, Okla.

Diutans are polysaccharide structures that often have a gum-like consistency. The use of diutans in treatment fluids are described in commonly owned U.S. Pat. Nos. 7,445,044; 7,547,665; 7,584,791; 7,595,282; 7,621,334; 7,694,739; 7,717,180; 7,727,936; 7,727,937; 7,748,456; 7,814,980; 7,829,508; 7,846,877; 7,862,655; and 7,883,944, each of which is incorporated herein by reference in its entirety. In some embodiments, the diutan can be a clarified diutan.

In some embodiments, the companion polymer can contain a repeat unit derived from acrylamide. A portion of a companion polymer containing an acrylamide repeat unit is shown below, where the wavy lines represent bonding to other monomer units.

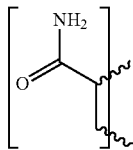

In some embodiments, the companion polymer can be a polyacrylate. A portion of a companion polymer containing an acrylate ester repeat unit is shown below, where the wavy lines represent bonding to other monomer units and R is an alkyl or aryl group, for example.

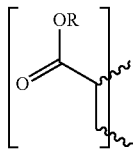

In some embodiments, at least a portion of the side chains of the companion polymer are hydrolyzed. That is, when the companion polymer contains acrylamide and/or acrylate ester repeat units, at least a portion of the side chain amide or carboxylic esters therein are hydrolyzed to the corresponding carboxylic acid. In such embodiments in which at least a portion of the side chains are hydrolyzed, at least a portion of the companion polymer contains acrylic acid monomer units. A partial structure of a companion polymer containing acrylic acid monomer units is shown below, where the wavy lines represent bonding to other monomer units (e.g., other acrylic acid monomer units and/or other acrylamide or acrylate ester monomer units).

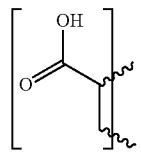

Depending on the pH, companion polymers having hydrolyzed side chains can be in their protonated (i.e., acidic) or deprotonated (i.e., anionic forms).

In some embodiments, the companion polymer can be a polyacrylamide, specifically a polyacrylamide in which at least a portion of the side chains are hydrolyzed. A number of partially hydrolyzed polyacrylamides are known in the art and commercially available. Two commercially available polyacrylamides that are suitable for use in the present embodiments include, for example, "FR-66" and "FDP-835," each of which is available from Halliburton Energy Services of Duncan, Okla. "FR-66" is a partially hydrolyzed polyacrylamide available in an oil base having a molecular weight of at least about 10,000,000. "FDP-835" is a partially hydrolyzed polyacrylamide available in an aqueous solution having a molecular weight of less than about 500,000. Hence, the molecular weight of the companion polymer can span a wide range in the present embodiments. In some embodiments, a molecular weight of the polyacrylamide can range between about 100,000 and about 10,000,000 or between about 500,000 and about 10,000,000. Higher or lower molecular weights for a polyacrylamide companion polymer can also be suitable and lie within the spirit and scope of the present invention.

In some embodiments, the companion polymer can have at least some propensity for modifying the water permeability of a subterranean formation. This is particularly true for partially hydrolyzed polyacrylamides, which can be used as the companion polymer in some embodiments of the present invention. At the concentrations used in the present embodiments, however, these companion polymers do not typically achieve a reduction in water permeability of greater than about 80% without the relative permeability modifier being present. As noted above, there can be a synergistic interaction between the relative permeability modifier and the companion polymer such that the propensity of the present treatment fluids for modifying the water permeability or the aqueous fluid injection pressure of a subterranean formation is greater than the additive effect of the relative permeability modifier and the companion polymer, each acting independently. Without being limited by theory or mechanism in the present embodiments, the companion polymer can increase the water permeability reduction exerted by the relative permeability modifier and/or the relative permeability modifier can increase the water permeability reduction exerted by the companion polymer, particularly when the companion polymer itself has significant water permeability reduction properties.

In general, it is desirable to hold the total polymer concentration as low as possible. For example, excessive concentrations of polyacrylamide or partially hydrolyzed polyacrylamides in a subterranean formation can result in an unacceptable reduction in hydrocarbon production therefrom. By keeping the concentration of a polyacrylamide companion polymer as small as possible, as in the present embodiments, this problem can be minimized. The same can hold true for "HPT-1" and other relative permeability modifiers. That is, excessive amounts of relative permeability modifier can detrimentally impact the subterranean formation's permeability to hydrocarbons in some embodiments.

In some embodiments, treatment fluids of the present invention can further comprise at least one surfactant. Such surfactants include cationic surfactants, anionic surfactants, zwitterionic surfactants and non-ionic surfactants, numerous examples of each of which are known to one of ordinary skill in the art. When present, a surfactant can be used in the present treatment fluids at a concentration ranging between about 0.1% and about 2.0% by weight or between about 0.5% and about 1.0% in various embodiments.

Illustrative examples of surfactants can include, without limitation, ethoxylated nonyl phenol phosphate esters, alkyl phosphonates, linear alcohols, nonylphenol compounds, alkyoxylated fatty acids, alkylphenol alkoxylates, ethoxylated amides, ethoxylated alkyl amines, betaines, methyl ester sulfonates (e.g., as described in commonly owned U.S. Pat. Nos. 7,159,659; 7,299,874; and 7,303,019 and U.S. patent application Ser. No. 11/058,611, filed Feb. 2, 2005 (now available as United States Patent Application Publication 2006/0183646), the entire disclosures of which are incorporated herein by reference), hydrolyzed keratin (e.g., as described in commonly owned U.S. Pat. No. 6,547,871, the entire disclosure of which is incorporated herein by reference), sulfosuccinates, taurates, amine oxides, alkoxylated fatty acids, alkoxylated alcohols (e.g., lauryl alcohol ethoxylate, ethoxylated nonyl phenol), ethoxylated fatty amines, ethoxylated alkyl amines (e.g., cocoalkylamine ethoxylate), modified betaines, alkylamidobetaines (e.g., cocoamidopropyl betaine) and quaternary ammonium compounds (e.g., trimethyltallowammonium chloride, trimethylcocoammonium chloride). Suitable surfactants can be used in a liquid or powder form.

In some embodiments, the at least one surfactant can be selected such that it improves the stability of the treatment fluid by inhibiting or substantially minimizing precipitation that can occur for some relative permeability modifiers at high pH and/or elevated temperature. Co-pending and commonly owned U.S. patent application Ser. No. 12/956,569, filed Nov. 30, 2010, which is incorporated herein by reference in its entirety, provides further disclosure to this effect.

Specifically, in some embodiments, the present treatment fluids can further include at least one anionic surfactant that improves their stability. Suitable anionic surfactants that can improve the stability of the present treatment fluid include, for example, poly(ethylene oxide) sulfonates, poly(ethylene oxide) carboxylates, poly(ethylene oxide) sulfates, poly(propylene oxide) sulfonates, poly(propylene oxide) carboxylates and poly(propylene oxide) sulfates. Particularly suitable anionic surfactants can include, for example, "EMULSOGEN COL 100" and "EMULSOGEN LS 24N," each of which is a poly(ethylene oxide) anionic surfactant that is available from Clariant Corporation, and "EMCOL CNP 110," a poly(ethylene oxide) anionic surfactant that is available from Akzo Nobel Corporation.

In other embodiments, the present treatment fluids can include at least one surfactant that is not an anionic surfactant, which can optionally be used in combination with an anionic surfactant. In some embodiments, suitable surfactants are amphoteric surfactants such as, for example, fatty acids having quaternized amine groups, betaines (e.g., cocoamidopropyl betaine, palmitamidopropyl betaine and lauryl betaine), glycinates and imidazolines. In some embodiments, a suitable amphoteric surfactant can be "HC-2," an amphoteric surfactant that is commercially available from Halliburton Energy Services of Duncan, Okla.

Further, the present treatment fluids can optionally comprise any number of additional additives commonly used in treatment fluids including, for example, scale inhibitors, corrosion inhibitors, gelling agents, crosslinking agents, foaming agents, defoaming agents, antifoam agents, emulsifying agents, de-emulsifying agents, iron control agents, proppants or other particulates, particulate diverters, salts, acids, fluid loss control additives, gas, catalysts, clay control agents, dispersants, flocculants, scavengers (e.g., $H_2S$ scavengers, $CO_2$ scavengers or $O_2$ scavengers), lubricants, breakers, friction reducers, bridging agents, viscosifiers, weighting agents, solubilizers, pH control agents (e.g., buffers), hydrate inhibitors, consolidating agents, bactericides, and the like. Combinations of these additives can be used as well.

In various embodiments, the present compositions and methods can reduce the permeability of at least a portion of a subterranean formation to aqueous based fluids without substantially changing the permeability of the subterranean formation to hydrocarbons. After placement downhole in a subterranean formation containing water-producing zones and hydrocarbon-producing zones, the relative permeability modifier alters the permeability of the water-producing zones without substantially affecting the production of hydrocarbons from the hydrocarbon-producing zones. Without being bound by theory or mechanism, it is believed that during normal "leak-off" of the base fluid of the treatment fluid, the relative permeability modifier is adsorbed into the subterranean formation, thereby leading to a significant reduction in water permeability. It will be appreciated by one of ordinary skill in the art that the present compositions and methods are advantageous, at a minimum, because they allow zonal isolation between the water-producing zones and the hydrocarbon-producing zones of a subterranean formation at the time of completion, thereby eliminating or postponing the need for water shutoff during the production phase of the well. Further, the present compositions and methods can advantageously extend the life of a well. Treatment fluids of the present invention can be used in both newly drilled subterranean formations and in formations needing re-stimulation.

To facilitate a better understanding of the present invention, the following examples of preferred embodiments are given. In no way should the following examples be read to limit, or to define, the scope of the invention.

EXAMPLES

Example 1

Brine Permeability in Brown Sandstone at 175° F.

A sandstone core was treated with a treatment fluid containing a relative permeability modifier and various polyacrylamide-based companion polymers at the concentrations indicated in Table 1. Permeability measurements were made at 175° F. The base fluid of the treatment fluid was 2% aqueous KCl. The reduction in core permeability was measured according to standard methods described in U.S. Pat. No. 6,476,169, which is incorporated herein by reference in its entirety above. The sequence of addition for the permeability measurements was 1) water, 2) oil, 3) water, 4) treatment fluid, and 5) water. Testing results demonstrating a synergistic effect are summarized in Table 1.

TABLE 1

| Treatment Fluid Composition | Treatment Fluid Concentration (wt. %) | Treatment Volume (mL) | Total Amount of Polymer (g) | Pressure Increase After Treatment (psi) | Permeability Reduction (%) |
|---|---|---|---|---|---|
| HPT-1 | 0.060 | 150 | 0.09 | 8 | 44 |
| FR-66[b] | 0.025 | 150 | 0.0375 | 30 | 69 |
| HPT-1/FR-66 | 0.060/0.025 | 150 | 0.09/0.0375 | 69 | 99 |
| HPT-1/FDP-835[c] | 0.060/0.025 | 100 | 0.06/0.025 | 500 | 98 |

[a]"HPT-1" is a hydrophobically modified hydrophilic polymer that is available from Halliburton Energy Services of Duncan, Oklahoma.
[b]"FR-66" is a partially hydrolyzed polyacrylamide emulsion in oil having a molecular weight of greater than about 10,000,000 that is available from Halliburton Energy Services of Duncan, Oklahoma.
[c]"FDP-835" is a partially hydrolyzed polyacrylamide aqueous solution having a molecular weight of less than about 500,000 that is available from Halliburton Energy Services of Duncan, Oklahoma.

The results in Table 1 demonstrate the synergistic interactions between polyacrylamide companion polymers and a hydrophobically modified hydrophilic polymer relative permeability modifier. When "FR-66" and "HPT-1" were used separately for treatment, poor water permeability reduction was observed. However, when mixed together at like concentrations in a treatment fluid, a very high water permeability reduction and a non-additive injection pressure increase were observed. Similar effects were observed for the combination of "HPT-1" and "FDP-835." It should be noted that the treatment fluid containing "FDP-835" produced a greater injection pressure increase than did "FR-66" in spite of its lower molecular weight. The difference in injection pressure increase may possibly be attributed to the oil emulsion of "FR-66" or differences in the hydrolysis levels of the two companion polymers.

Example 2

Brine Permeability in Oklahoma #1 Sand Pack at Room Temperature

Permeability testing was conducted as described above for Example 1, except the core sample was an Oklahoma #1 Sand Pack and testing was conducted at room temperature. In this case the sequence of addition for the water permeability measurements was 1) water, 2) treatment fluid, and 3) water. Testing results demonstrating a synergistic effect are summarized in Table 2.

TABLE 2

| Treatment Fluid Composition | Treatment Fluid Concentration (wt. %) | Treatment Volume (mL) | Total Amount of Polymer (g) | Pressure Increase After Treatment (psi) | Permeability Reduction (%) |
|---|---|---|---|---|---|
| HPT-1 | 0.12 | 150 | 0.18 | 1.3 | 13 |
| FR-66 | 0.025 | 150 | 0.0375 | 97 | 67 |
| HPT-1/FR-66 | 0.12/0.025 | 42 | 0.05/0.0105 | 500 | 99 |
| HPT-1 | 0.12 | 150 | 0.18 | 1.3 | 13 |
| FR-48[d] | 0.025 | 150 | 0.0375 | 32 | 60 |
| HPT-1/FR-48 | 0.12/0.025 | 86 | 0.103/0.0215 | 500 | 98 |
| HPT-1 | 0.12 | 150 | 0.18 | 1.3 | 13 |
| FDP-835 | 0.2 | 150 | 0.3 | 3 | 3 |
| HPT-1/FDP-835 | 0.12/0.2 | 117 | 0.14/0.23 | 500 | 99 |

[d]"FR-48" is an acrylamide/diallyldimethylammonium chloride copolymer that is available from Halliburton Energy Services of Duncan, Oklahoma.

In this example, synergistic interactions were again observed between a polyacrylamide companion polymer and a hydrophobically modified hydrophilic polymer for reducing the water permeability and increasing the injection pressure of a sand pack, much like that shown in Example 1. In all cases shown in Table 2, the combination of "HPT-1" and the companion polymer exerted a water permeability reduction that was greater than the additive amount of permeability reduction of the "HPT-1" and the companion polymer acting independently. The same was true for the injection pressure increase, where the increase was greater than the amount obtained from the individual polymer solutions.

Testing was also conducted in Oklahoma #1 Sand Pack where the "HPT-1" and the companion polymer ("FR-66") were added sequentially rather than combined in a single treatment fluid. In this case, much poorer water permeability reduction was observed. Testing results for sequential addition are summarized in Table 3.

TABLE 3

| Treatment Fluid Composition | Treatment Fluid Concentration (wt. %) | Treatment Volume (mL) | Pressure Increase After Treatment (psi) | Permeability Reduction (%) |
|---|---|---|---|---|
| Stage 1: HPT-1 | 0.12 | 150 | 3 | n/d |
| Stage 2: FR-66 | 0.025 | 150 | 4 | n/d |

Total Permeability Reduction = 18%

The low pressure increase observed after the "FR-66" stage is particularly surprising, since this companion polymer produced a 66 psi pressure increase alone (see Table 2). This data further illustrates that when the relative permeability modifier and the companion polymer are combined in a treatment fluid, there is a synergistic interaction between the polymers.

Example 3

Brine Permeability in Oklahoma #1 Sand Pack Column #2 (96% Oklahoma #1 Sand, 2% Bentonite and 2% Silica Flour) at Room Temperature Permeability testing was conducted as described above for Example 1, except the sample was a mixture of Oklahoma #1 Sand (96%), Bentonite (2%) and silica flour (2%), and testing was conducted at room temperature. In this case the sequence of addition for the water permeability measurements was 1) water, 2) treatment fluid, and 3) water. Testing results demonstrating a synergistic effect are summarized in Table 4.

TABLE 4

| Treatment Fluid Composition | Treatment Fluid Concentration (wt. %) | Treatment Volume (mL) | Total Amount of Polymer (g) | Pressure Increase After Treatment (psi) | Permeability Reduction (%) |
|---|---|---|---|---|---|
| HPT-1 | 0.060 | 150 | 0.09 | 11 | 56 |
| Diutan | 0.025 | 150 | 0.0375 | 85 | 68 |
| HPT-1/Diutan | 0.060/0.025 | 150 | 0.09/0.0375 | 414 | 97 |
| HPT-1 | 0.060 | 150 | 0.09 | 11 | 56 |
| HZ-20$^e$ | 0.025 | 150 | 0.0375 | 62 | 78 |
| HPT-1/HZ-20 | 0.060/0.025 | 88 | 0.06/0.025 | 500 | 99 |

$^e$"HZ-20" is a polyetherimine that is available from Halliburton Energy Services of Duncan, Oklahoma.

In this example, like polymer concentrations produced a water permeability reduction and injection pressure increase that were significantly higher for the synergistic combination of "HPT-1" and companion polymer. Synergistic interactions were observed at low "HPT-1" concentrations with a non-ionic polymer (diutan) and polyethyleneimine, a cationic polyamine. Such reductions of the relative permeability modifier quantities can result in significant cost savings for treatment operations.

Therefore, the present invention is well adapted to attain the ends and advantages mentioned as well as those that are inherent therein. The particular embodiments disclosed above are illustrative only, as the present invention may be modified and practiced in different but equivalent manners apparent to one skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. A method comprising:
   providing a treatment fluid that comprises:
      an aqueous base fluid as a continuous phase;
      a relative permeability modifier that comprises a hydrophobically modified hydrophilic polymer bearing a quaternized amine group with an N-alkyl substituent of about 6 to about 22 carbon atoms, a concentration of the relative permeability modifier being about 0.15% or lower by weight of the treatment fluid; and
      a companion polymer interacting synergistically with the relative permeability modifier such that the treatment fluid is operable to reduce the water permeability or to increase an aqueous fluid injection pressure of at least a portion of a subterranean formation by more than through using the relative permeability modifier or the companion polymer acting alone at like concentration, a concentration of the companion polymer ranging from about 0.025% and about 0.0075% of the treatment fluid by weight; wherein the companion polymer is not hydrophobically modified and comprises at least an acrylamide monomer unit; and
   placing the treatment fluid in a drilled well bore within a subterranean formation during a stimulation operation or a remediation operation.

2. The method of claim 1, wherein the treatment fluid is operable to reduce the water permeability of at least a portion of the subterranean formation by at least about 80%; and
   wherein a concentration of the relative permeability modifier in the treatment fluid is only operable to reduce the water permeability by about 5% to about 80% without the companion polymer.

3. The method of claim 1, wherein the treatment fluid is operable to reduce the water permeability of at least a portion of the subterranean formation by more than an additive water permeability reduction or to increase the aqueous fluid injection pressure of at least a portion of the subterranean formation by more than an additive aqueous fluid injection pressure increase obtained from the relative permeability modifier and the companion polymer, each acting independently.

4. The method of claim 1, wherein the hydrophobically modified hydrophilic polymer comprises at least one monomer unit derived from a cetyldimethylammoniumethyl methacrylate halide.

5. The method of claim 1, wherein at least a portion of the side chains of the companion polymer are hydrolyzed.

6. A method comprising:
providing a treatment fluid that comprises:
an aqueous base fluid as a continuous phase;
a relative permeability modifier that comprises a hydrophobically modified hydrophilic polymer bearing a quaternized amine group with an N-alkyl substituent of about 6 to about 22 carbon atoms, a concentration of the relative permeability modifier being about 0.15% or lower by weight of the treatment fluid; and
a companion polymer that comprises at least an acrylamide monomer unit;
wherein the companion polymer is not hydrophobically modified; and
wherein a concentration of the companion polymer ranges from about 0.025% and about 0.0075% of the treatment fluid by weight;
placing the treatment fluid in a drilled well bore within a subterranean formation during a stimulation operation or a remediation operation; and
allowing the treatment fluid to reduce a water permeability or to increase an aqueous fluid injection pressure of at least a portion of the subterranean formation.

7. The method of claim 6, wherein the hydrophobically modified hydrophilic polymer comprises at least one monomer unit derived from a cetyldimethylammoniumethyl methacrylate halide.

8. The method of claim 6, wherein the treatment fluid is operable to reduce the water permeability of at least a portion of the subterranean formation by at least about 80%; and
wherein a concentration of the relative permeability modifier in the treatment fluid is only operable to reduce the water permeability by about 5% to about 80% without the companion polymer.

9. The method of claim 6, wherein at least a portion of the side chains of the companion polymer are hydrolyzed.

10. A method comprising:
providing a treatment fluid that comprises:
an aqueous base fluid as a continuous phase;
a relative permeability modifier that comprises a hydrophobically modified hydrophilic polymer bearing a quaternized amine group with an N-alkyl substituent of about 6 to about 22 carbon atoms, the relative permeability modifier comprising at least one monomer unit derived from a cetyldimethylammoniumethyl methacrylate halide, and a concentration of the relative permeability modifier being about 0.15% or lower by weight of the treatment fluid; and
a companion polymer that comprises at least an acrylamide monomer unit, a concentration of the companion polymer ranging from about 0.025% and about 0.0075% of the treatment fluid by weight; and
wherein the treatment fluid is operable to reduce the water permeability of at least a portion of a subterranean formation by at least about 80% or to increase an aqueous fluid injection pressure of at least a portion of a subterranean formation above about 100 psi; and
placing the treatment fluid in a drilled well bore within a subterranean formation during a stimulation operation or a remediation operation.

11. The method of claim 10, wherein the companion polymer is not hydrophobically modified.

12. The method of claim 11, wherein the companion polymer comprises at least one polymer selected from the group consisting of a polyacrylate, a polyacrylamide, an acrylate/acrylamide copolymer, and an acrylamide/diallyldimethylammonium chloride copolymer.

13. The method of claim 12, wherein at least a portion of the side chains of the companion polymer are hydrolyzed.

14. A treatment fluid comprising:
an aqueous base fluid as a continuous phase;
a relative permeability modifier that comprises a hydrophobically modified hydrophilic polymer bearing a quaternized amine group with an N-alkyl substituent of about 6 to about 22 carbon atoms, a concentration of the relative permeability modifier being about 0.15% or lower by weight of the treatment fluid; and
a companion polymer interacting synergistically with the relative permeability modifier such that the treatment fluid is operable to reduce the water permeability or to increase an aqueous fluid injection pressure of at least a portion of a subterranean formation by more than through using the relative permeability modifier or the companion polymer acting alone, a concentration of the companion polymer ranging from about 0.025% and about 0.0075% of the treatment fluid by weight;
wherein the companion polymer is not hydrophobically modified and comprises at least an acrylamide monomer unit.

* * * * *